# 3,391,006
CURING EMULSIFIED MEAT PRODUCTS
Louis Sair, Evergreen Park, and Stephan L. Komarik, Chicago, Ill., assignors to The Griffith Laboratories, Inc., Chicago, Ill., a corporation of Illinois
No Drawing. Continuation-in-part of application Ser. No. 388,288, Aug. 7, 1964. This application Mar. 15, 1965, Ser. No. 439,976
5 Claims. (Cl. 99—159)

ABSTRACT OF THE DISCLOSURE

Emulsified meat with nitrite curing agent and with ene-diol compound is promptly encased and then promptly heated to an internal temperature of at least 150° F. at a nonshorting pH lower than the pH during emulsification, the heating being effected by exposure in an environment having a temperature in the range from 200° to 300° F., and the said lower pH being effected after emulsification by hydrolysis of an edible lactone or by adding edible acidic material or both.

---

The present application is a continuation-in-part of Ser. No. 388,288, filed Aug. 7, 1964 now abandoned.

The present invention relates to the curing of meat products, and in particular, to accelerating the process to adapt it to automation procedure.

Curing of meat has long been effected by generation of nitric oxide from supplied alkali-metal nitrite and/or nitrate, it being recognized that nitrite produces a faster cure than nitrate alone. The cure is a reaction of the nitric oxide with the pigments of the meat. The color of cured meat must develop in a reducing and acidic environment, and once developed, the color can be fixed by heat.

Meat on standing, as in a chill room, develops its own reducing environment and heretofore storage for an appreciable time in a chill room has been practiced to effect this environment and initiate the curing reaction. Also, it has been commercial practice to place the meat with its curing agent in a moderately heated smokehouse, whereby the slow heating of the meat permits the color to develop and be fixed. Both of these procedures call for extended times for processing.

Acidity favors the curing reaction, but little study has been given to acidity, largely because the meat is normally acid. On death and during rigor mortis lactic acid is generated in the meat, the quantity formed and the resulting pH below 7 being dependent on many factors. This acid aids the curing. However, it is known that additional acid will accelerate the cure, but there are other factors working against the addition of acid. Meat to be encased is first comminuted and emulsified and this is commonly done with the curing salt already present with the meat. Emulsification is the comminuting and surrounding of the fat particles with protein. A too-acid condition prevents forming a good emulsion, or if such condition is effected after emulsification it breaks the emulsion, or "shorts" it, thus exhibiting pockets of fat in encased meat products. Therefore, comminuting, emulsifying, encasing and smoking have long been done without adding acid, except that controlled amounts of an isomer of ascorbic acid have been added, not for its acidity but rather for its reducing power. In fact, the addition of a limited quantity of alkaline material to elevate the pH toward 7 has been practiced to aid in emulsification.

U.S. Patents Nos. 2,992,115, 2,992,116 and 3,112,442, describe certain lactones and use thereof gradually to generate acidity in meats. The lactones are those which slowly hydrolyze and form edible acid. In emulsifying meat the protein functions as a colloid to surround the fat particles. By the presence of such a lactone during the emulsification the function of the protein is not impaired. Once the emulsion is formed the lactone can slowly generate acid in the emulsion in addition to the lactic aicd without destroying the emulsion, so a nonshorting quantity of acid may exert its function in the curing reaction. The preferred lactone is glucono delta lactone (GDL).

Hollenbeck in U.S. No. 2,739,899 has taught the use of ene-diol material, thus to provide the reducing environment without need to store the emulsion for so long a time for the meat to generate its reducing environment. The introduction of such reducing material into the meat industry has decreased the processing time as well as improved the cured color. Ascorbic acid and d-isoscorbic acid and their water-soluble salts are the preferred ene-diol compounds.

Because meat is perishable, the shorter the time meat is in process, the better the quality of the product. The use of ascorbates to a degree shortens one step in the processing period. The use of a source for acid, as by using GDL, does not of itself shorten the processing, but in combination with higher than conventional temperatures in the smokehouse, with or without ene-diol material, can shorten the last functional step in the process, when such step is carried out according to the present invention.

Modern packers have long aimed to expedite the curing of sausage products by eliminating batch processing, long time storage in chill rooms, delays to stuff casings, and long time hanging in a smokehouse. New and expensive apparatus have been devised in efforts leading to automation. Among these are continuous stuffing machines, and especially continuous comminuting machines in which the meat mixed with curing salts with or without ascorbate salts can be emulsified. These are frequently operated in tandem, effecting the final emulsion in a second unit. Such continuous emulsifiers replace the silent cutter which operates only in batches.

Another known accelerating step is to subject a completed emulsion to a vacuum to withdraw air, thus more quickly to effect the reducing environment for the cure reaction. Such a step is desirable, but optional.

To secure the fixed cured color the meat must be heated, and it has been an accepted practice to heat it to attain an internal temperature in the range from 150° F. to 160° F. It has been the practice gradually to heat the meat in an environment of gradually increasing temperatures for a sufficient time to effect the desired color and to bring the internal temperature to about 155° F. The use of ascorbates shortens this period by permitting the temperature of the heating environment to be raised more rapidly.

We have discovered from using glucono delta lactone during emulsification, that it is the increased but nonshortening quantity of acid in the finished emulsion and the pH of the emulsion lower than that of the meat being emulsified, which permits expediting the cure to fix the color at smokehouse temperatures higher than conventional and in the range from 200° F. to 300° F. The use of ene-diol material, such as sodium erythorbate, in combination with the more acid emulsion, gives better color than when no ene-diol material is used.

The use of a slowly hydrolyzable lactone in the meat mass during emulsification is the preferred method of belatedly providing edible acid in the finished emulsion, thus to provide more acid than is present during the emulsification. This eliminates the alternative but useful method of emulsifying the meat mass without such a lactone, and then after emulsification, mixing into the emulsion such a lactone or edible acid, or other edible acidifying material, or a mixture of the same, to lower the pH and provide a non-shorting quantity of acid for the curing reaction. So to do invites exposing the emulsion to oxidation by the air, which is undesirable, unless the process is carried out in a vacuum or in an inert atmosphere. Such additional mixing of the finished emulsion with non-shorting acidifying material and the expense of such operation is avoided by the initial use of the lactone, preferably with ene-diol material. Nevertheless, such acidification after emulsification is contemplated as falling within the scope of the present invention.

By use of the present invention an emulsion containing a non-shorting quantity of acidifying material, howsoever added, with or without ene-diol material, may be promptly encased, and promptly entered into a smokehouse at a temperature in the range from 200° F. to 300° F., so that the color is developed and fixed before the internal temperature reaches 150° F., and so that the color improves as the internal temperature is allowed to increase. Even though a lactone may be present in the emulsion when entering the smokehouse, the lactone hydrolyzes more quickly at the elevated temperature than at the lower temperature of a cooler, as in the prior art.

Thus, the prior art cure-time including storage time of the prior art before color fixation by heat, plus the time in the smokehouse, is no longer a limiting factor in the production of encased meat products.

We have now discovered that use of ascorbates in combination with a slowly hydrolyzable lactone in the meat mass to be emulsified so hastens the development of the color that the emulsion may be promptly encased after completion, and the encased emulsified meat may be placed immediately in an environment of 200° F. to 300° F., to fix the color. Thus, the color is developed and fixed before the internal temperature of at least 150° F. is reached, and we have discovered that the color is improved by attaining an internal temperature well above 150° F., so long as the product retains an edible texture.

Accordingly, it is the general object of the invention to accelerate the production of encased meat emulsion products, by control of the compositions of the meat mass during emulsification, and after emulsification, and by use of curing temperatures well above the conventional smokehouse temperatures.

It is a particular object of the invention to effect the cure of the meat emulsion at a lower pH than exists during the emulsification.

It is also an object of the invention to emulsify a meat mass so that after emulsification it generates acid automatically to lower the pH for the resulting cure, thus to avoid incorporating additives into the emulsion.

Various other and ancillary objects and advantages of the invention will appear from the description below.

The size of the encased meat product to be heated is a factor involved in the composition of the meat mass to be cured. In general, the longer the product is to be heated, to attain the desired internal temperature, because of its size, the less may be the acid content of the meat composition. For example, in processing frankfurters in an environment of 250° F. which may require about fourteen minutes, the composition of the meat mass calls for 6 to 8 ounces of glucono delta lactone per 100 pounds of meat. In larger casings, such as Bologna sausage in casings 3½-inches in diameter, longer times are required at 200° F. and over, to reach an internal temperature of at least 150° F. when from 2 to 4 ounces of glucono delta lactone are used to expedite the cure to a fixed color.

For the present invention the GDL or other lactone may be incorporated with the meat just before, during or after emulsification for subjecting it to an environment of 200° F. to 300° F. The prime function of GDL is to assure, during the heating period to accelerate the cure, a non-shorting quantity of acid in amount greater than is present during emulsification. The relatively large amount of GDL required for a relatively short time of heating, such as mentioned above for frankfurters, is such that if an equivalent acidity were produced by adding an edible acid to a meat emulsion, the emulsion might be broken. Therefore, it is to be understood that the final acid content can be reached not only by use of a lactone as the sole source of non-meat acid, but by varying mixtures of lactone and added edible acid. For such a mixture the limiting proportion of acidifying material is determined by the shorting of the emulsion. When using lactone alone for the additional acid, none of it, or all or part of it may have hydrolyzed when the meat enters the smokehouse. Hence, such an emulsion may contain acidifying material selected from the group consisting of such lactone, edible acid resulting from such lactone, and a mixture thereof.

The following pilot experiments have led to our discovery of a quick-cure process.

A meat composition was used as follows:

| | |
|---|---|
| Beef knuckles _____lbs__ | 70 |
| Fat back _____lbs__ | 30 |
| Ice _____lbs__ | 30 |
| Sodium chloride _____lbs__ | 2.5 |
| Curing salt: | |
|   Sodium chloride, 90%; sodium nitrite, 6%; sodium nitrate, 4% _____ozs__ | 4 |
| Sodium erythorbate _____oz__ | ⅞ |
| Frankfurter seasoning _____ozs__ | 10 |

The mixture was emulsified in a chopper and had an initial pH of 5.70. To one-half of the emulsion was added dextrose in the amount of 8 ounces to 100 pounds of meat for use as "controls" and to the other half was added 8 ounces of GDL per 100 pounds of meat for "tests." The two portions were promptly placed in two sets of test tubes ⅞-inch in diameter and 8-inches long to be immersed promptly in heated oil baths of different temperatures. The time of immersion, internal emulsion temperature and cure color were recorded. In the table below, the "controls" and the "tests" were paired. In all cases, the "controls" exhibited a gray color when the "tests" were reported as pink in the Table I.

TABLE I.—OIL BATH TEMPRATURE
[Tests only reported]

| Minutes Immersed | 175°–180° F. | | 192°–205° F. | | 217°–225° F. | |
|---|---|---|---|---|---|---|
| | Emulsion Temp. | With GDL | Emulsion Temp. | With GDL | Emulsion Temp. | With GDL |
| 2 | 90 | Slight Pink. | 112 | Pink | 134 | Pink. |
| 3 | 114 | Pink | 138 | Very Pink. | 162 | Very Pink. |
| 4 | 138 | Pink | 148 | Very Pink. | | |
| 5 | 140 | Pink | 156 | Very Pink. | | |
| 6 | 150 | Pink | | | | |
| 7 | 155 | Very Pink. | | | | |

It is noted in the above that the emulsion in the hottest bath of 217°–225° F. reached a temperature of 162° F. in three minutes with excellent fixed color.

Table II shows the final pH of the cured emulsions of Table I, and also the color reading.

TABLE II

| Sample | Oil Temperature, °F. | pH | Color on 525B Filter |
|---|---|---|---|
| Control | 175–180 | 6.00 | 21.5 |
| Test | 175–180 | 5.50 | 52.0 |
| Control | 192–205 | 5.95 | 28.5 |
| Test | 192–205 | 5.40 | 55.0 |
| Control | 217–225 | 5.95 | 36.0 |
| Test | 217–225 | 5.45 | 64.0 |

Table II shows that both the "controls" and the "tests" improved in color as the oil temperature increased, but the best color of the "controls" is well below the poorest color of the "tests." The advantage of an added source of acidity beyond that of the meat is evident, but this advantage is not only enhanced at the higher temperature, but according to Table I, it is more quickly realized.

A second study was made using the following meat Composition No. 2:

| | |
|---|---|
| Lean beef _____lbs__ | 60 |
| Pork jowls _____lbs__ | 40 |
| Chipped ice _____lbs__ | 30 |
| Sodium chloride _____lbs__ | 2.5 |
| Curing salt: | |
|   Sodium chloride, 90%; sodium nitrate, 6%; sodium nitrate, 4% _____ozs__ | 4 |
| Corn syrup solids _____ozs__ | 32 |
| Frankfurter seasoning _____ozs__ | 10 |
| Sodium erythorbate _____oz__ | ¾ |

Three separate emulsions were made in a chopper and discharged at 58° F., one for a control, one to which is added before emulsification 4 ozs. GDL per 100 lbs. of meat, and one to which 8 ozs. of GDL is added per 100 lbs. of meat before emulsification. Each emulsion was stuffed into frankfurter casings and placed directly in a smokehouse at 195°–205° F., within five minutes of completing the emulsion.

*Control Composition No. 2.*—The emulsion from the chopper had a pH of 5.75. Table III shows the conditions:

TABLE III

| Smokehouse, °F. | Minutes in Smokehouse | Internal Meat Temperature, °F. |
|---|---|---|
| 190 | 10 | 92 |
| 195 | 16 | ---- |
| 203 | 20 | ---- |
| ---- | 21 | 130 |
| 207 | 25 | ¹ 144 |
| 203 | 30 | ² 154 |

¹ No color development.
² No internal color development.

The frankfurters were not hard on the outside and peeled easily.

*The 4 ozs. GDL in Composition No. 2.*—Table V shows the difference in result when the GDL is used.

TABLE IV

| Smokehouse, °F. | Minutes in Smokehouse | Internal Meat Temperature, °F. |
|---|---|---|
| 190 | 10 | ---- |
| 200 | 20 | 130 |
| 208 | 25 | ¹ 145 |
| ---- | 30 | ² 154 |

¹ Slight color development.
² Definite, but not full color development.

*The 8 ozs. GDL in Composition No. 2.*—Table V shows the difference resulting from using more GDL.

TABLE V

| Example | Smokehouse, °F. | Minutes in Smokehouse | Internal Meat Temperature, °F. |
|---|---|---|---|
| ---- | 194 | 10 | ---- |
| ---- | 198 | 20 | ¹ 130 |
| ---- | 195 | 25 | ² 144 |
| ¹ | 200 | 30 | ³ 154 |

¹ No color development.
² Slight color development.
³ Good color development throughout.

In each of the three cases above, the frankfurters from the smokehouse were chilled immediately in cold water to 100° F. The following Table VI shows analytical results of the three sets.

TABLE VI

| | Control | 4 ozs. GDL | Example 1 8 ozs. GDL |
|---|---|---|---|
| pH | 6.15 | 5.75 | 5.35 |
| Cure color (525B Filter) | ¹ 17 | ² 49.5 | ³ 68.0 |
| Residual nitrite (p.p.m.) | 65 | 62 | 51 |

¹ Denotes a gray.
² Denotes considerable cured color.
³ Denotes full color.

The initial pH of 5.70 in the control increased during the heating to 6.15, which is a normal action. With 4 ozs. of GDL present the pH was maintained practically at the 5.70 of the formed emulsion, thus counteracting the normal rise. With 8 ozs. of GDL, the pH was lowered with better results as shown. Better and quicker color developed and less residual nitrite remained.

The following tables show the use of heat at 300° F. and the advantage of combining an ascorbate and a lactone, using the following Composition No. 3:

| | |
|---|---|
| Lean beef _____lbs__ | 35 |
| Beef flanks _____lbs__ | 45 |
| Pork jowls _____lbs__ | 20 |
| Chipped ice _____lbs__ | 22 |
| Sodium chloride _____lbs__ | 2.5 |
| Curing salt: | |
|   Sodium chloride, 90%; sodium nitrite, 6%; sodium nitrate, 4% _____ozs__ | 4 |
| Frankfurter seasoning _____ozs__ | 10 |

This composition was modified by additions as follows:

TABLE VII

| Example | Composition | Addition per 100 lbs. Meat |
|---|---|---|
| 2a | 3a | 1 oz. sodium erythorbate. |
| 2b | 3b | 1 oz. sodium erythorbate 8 ozs. GDL. |
| 2c | 3c | 8 ozs. GDL. |

The three compositions were emulsified in a chopper, immediately stuffed into casings, and immediately placed in a smokehouse at 250° F. (dry bulb) and at 160° F. (wet bulb) with the following results:

TABLE VIII

| Example | Composition | Minutes Heating | Color Development | Internal Meat Temperature, °F. |
|---|---|---|---|---|
| 2a | 3a | 5 | No color | 132 |
| | 3a | 10 | Slight color | 142 |
| | 3a | 14 | ----do---- | 160 |
| 2b | 3b | 5 | Color starting | 132 |
| | 3b | 10 | Good Color | 142 |
| | 3b | 14 | Very good color | 160 |
| 2c | 3c | 5 | No color | 132 |
| | 3c | 10 | Slight color | 142 |
| | 3c | 14 | ----do---- | 160 |

From the smokehouse the frankfurters were chilled in a cold shower to an internal temperature of 110° F., held at room temperature for 15 minutes, then transferred to a chill room. When chilled, they were easily peeled, showing that the smokehouse conditions were satisfactory.

The quality of the products is shown by the following analysis:

TABLE IX

| Example | 2a | 2b | 2c |
|---|---|---|---|
| Moisture, percent | 52.62 | 52.90 | 53.72 |
| Protein (N×6.25), percent | 12.48 | 12.87 | 12.27 |
| Fat, percent | 30.97 | 29.06 | 29.63 |
| Residual nitrite (p.p.m.) | 100 | 62 | 71 |
| pH | 6.00 | 5.45 | 5.35 |
| Cured color ¹ (525B filter) | 40.50 | 66.5 | 57.5 |

¹ The higher number the better color.

Example 2a shows lack of color by reason of lack of increased acid after emulsification. Example 2b shows the best color resulting from the combined use of GDL and sodium erythorbate. Example 2c shows acceptable color by use of the GDL without ene-diol material.

The following tables show the use of still higher smokehouse temperatures with the same Compositions No. 3.

TABLE IXa

| Example | Smokehouse Temperature | Minutes Heating | Color Development | Internal Temp., °F. |
|---|---|---|---|---|
| 2a′ | 300° F. (D.B.) 178° F. (W.B.) | 6 | Gray | |
| 2a′ | 300° F. (D.B.) 178° F. (W.B.) | 11 | ....do | 153 |
| 2b′ | 300° F. (D.B.) 178° F. (W.B.) | 6 | Pink | |
| 2b′ | 300° F. (D.B.) 178° F. (W.B.) | 11 | Red | 153 |
| 2b′ | 275° F. (D.B.) 175° F. (W.B.) | 7 | Pink | |
| 2b′ | 275° F. (D.B.) 175° F. (W.B.) | 13 | Red | 158 |

On removal from the smokehouse they were showered, held, chilled and easily peeled as above described. There was no surface rendering of fat or moisture. The analysis is as follows:

TABLE X

| Example | 2a′ | 2b′ (275° F.) | 2b′ (300° F.) |
|---|---|---|---|
| Moisture, percent | 54.12 | 56.20 | 54.87 |
| Protein (N×6.25), percent | 13.70 | 13.45 | 13.72 |
| Fat, percent | 29.22 | 27.26 | 21.31 |
| Residual nitrite (p.p.m.) | 94.0 | 54.0 | 52.0 |
| pH | 6 | 5.50 | 5.55 |
| Cured color | 42.50 | 61.40 | 62.50 |

Example 3

Composition No. 4:
| | Parts by weight |
|---|---|
| Beef knuckles | lbs__ 50 |
| Pork jowls | lbs__ 50 |
| Chipped ice | lbs__ 30 |
| Fine flake sodium chloride | lbs__ 2.5 |
| Curing salt: Sodium chloride, 90%; sodium nitrite, 6%; sodium nitrate, 4% | 4 |
| Frankfurter seasoning | ozs__ 8 |
| Seasoning (garlic powder) | oz__ 1/16 |
| Glucono delta lactone | ozs__ 7⅛ |
| Sodium erythorbate | oz__ ⅞ |

The above composition was reproduced as four separate lots. Each lot was emulsified, then promptly encased as frankfurters, and promptly entered into the smokehouse at 220° F. The frankfurters were removed at various times as given in the table below, at the internal temperature also given in the table. All the frankfurters were good edible unshorted emulsions, and had good color improving as the final internal temperature increased. Other properties are given in the table.

TABLE XI

| Lot | Cure Time at 220° F. | Internal Temp., °F. | Emulsion pH | Finished pH | Color |
|---|---|---|---|---|---|
| 1 | 28 mins | 155 | 5.78 | 5.60 | 46.5 |
| 2 | 29 mins | 160 | 5.65 | 5.62 | 51.0 |
| 3 | 32 mins | 165 | 5.65 | 5.60 | 55.5 |
| 4 | 36 mins | 170 | 5.60 | 5.60 | 58.0 |

Although the invention gives the best results when an ascorbate is used, the ascorbate may be omitted. This is shown by the following series of comparative tests.

Example 4

A meat composition No. 5 was employed as follows:

| | Parts by weight |
|---|---|
| Beef rounds | 35 lbs. |
| Beef flanks | 45 lbs. |
| Pork jowls | 20 lbs. |
| Ice | 22 lbs. |
| Sodium chloride | 2 lbs. 4 ozs. |
| Curing salt: Sodium chloride, 90%; sodium nitrite, 6%; sodium nitrate, 4% | 4 ozs. |
| Frankfurter seasoning | 8 ozs. |

Three runs were made using the following materials in amounts $x$ and $y$ per 100 pounds of meat in the above compositions.

| Example | $x$ Sodium Erythorbate, ounce | $y$ GDL, ounces |
|---|---|---|
| 4a | 1 | 0 |
| 4b | 1 | 8 |
| 4c | 0 | 8 |

The compositions weer emulsified promptly after inclusion of the above additives. The emulsion was then promptly encased and the casings entered into a smokehouse initially at 250° F. The following Table XII records the processing and results:

TABLE XII

| Example | | After 5 Minutes | After 10 Minutes | After 14 Minutes |
|---|---|---|---|---|
| 4a | House Temp | 230° F. | 240° F. | 235° F. |
| | Int. Temp | 132° F. | 142° F. | 160° F. |
| | Color | None | Slight | Slight. |
| 4b | House Temp | 230° F. | 240° F. | 235° F. |
| | Int. Temp | 132° F. | 142° F. | 160° F. |
| | Color | Present | Good | Very Good. |
| 4c | House Temp | 230° F. | 240° F. | 235° F. |
| | Int. Temp | 132° F. | 142° F. | 160° F. |
| | Color | None | Slight | Some.[1] |

[1] As removed from smokehouse, color not very good, but it greatly improved in 24 hours.

As soon as the casings were entered into the house at 250° F. and the wet-bulb temperature control set for 150° F., the house temperature dropped to 230° F., then rose to 240° F. At the 10-minute time steam was introduced to effect peelability of the casings and the temperature dropped to 235° F. Because of door openings to sample the temperature dropped, increasing the time to that shown, but in commercial practice the reported time would be shortened because of lack of such cooling. Increasing the time for Example 4c will improve the color above the "slight" reported.

The products were evaluated as follows:

TABLE XIII

| Example | Protein, percent | Moisture, percent | | Sodium Nitrite, p.p.m. | Cured Color Filter 525B |
|---|---|---|---|---|---|
| | | Found | Allowed [1] | | |
| 4a | 12.45 | 52.62 | 59.30 | 100 | 40 |
| 4b | 12.87 | 52.90 | 61.48 | 62 | 66.5 |
| 4c | 12.27 | 53.72 | 59.08 | 71 | 57.5 |

[1] A Federal regulation limits the moisture content of frankfurters. The lower amounts found indicate that more moisture could have been added during heating in the smokehouse.

Accordingly, there is produced in one way or another, a completed stable meat emulsion containing curing salt, including essentially alkali-metal nitrite, and optionally but preferably ene-diol material, and a non-shorting quantity of added acidifying material, preferably including a lactone which slowly hydrolyzes to edible acid, with or without free edible acid, such as gluconic, lactic, citric, ascorbic and isoascorbic, or other acidifying agent, such as monosodium phosphate. Such an emulsion is known to the prior art insofar as the acidifying material is the lactone and insofar as the ene-diol material is present. Heretofore, such an emulsion has been stored in a chill room, then stuffed into casings, and the casings then heated by exposure to gradually increasing temperatures upwardly from about 140° to 190° F. to complete the color formation, to fix the color, and to elevate the internal temperature of the so cured meat to 150°–160° F. In the case of frankfurters, has taken 1½ to 2-hours to reach the internal temperature. This results in a shrinkage of 6 to 9%.

According to the present invention it is not necessary to store the emulsion in a chill room, because it may be stuffed immediately into casings and the casings then heated by exposure to temperature in the range from 200° F. to 300° F. in a humid environment, to attain an internal temperature of at least 150° F. and higher, the color improving as the internal temperature is higher.

In practicing the present invention, time of exposure to the high temperature can be increased without adverse loss of water and texture in the product, and with improved color, by attaining an internal temperature of at least 150° F., preferably in the range from 155° F. to 165° F., and even as high as 205° F. The color improves as the internal temperature is higher. As the time increases the shrink increases. These facts leave it to the judgment of the operator as to the shrink to be tolerated, and the time to be consumed, so that the internal temperature above 150° F. may vary over a wide range.

The following example illustrates the improvement in color by longer exposure to increase the final internal temperature.

Example 5

| Composition No. 6: | Parts by weight |
|---|---|
| Beef knuckles | lbs__ 50 |
| Pork jowls | lbs__ 50 |
| Chipped ice | lbs__ 30 |
| Fine flake sodium chloride | lbs__ 2.5 |
| Curing salt: | |
| Sodium chloride, 90%; sodium nitrite, 6%; sodium nitrate, 4% | ozs__ 4 |
| Frankfurter seasoning | ozs__ 8 |
| Seasoning (garlic powder) | oz__ 1/16 |
| Glucono delta lactone | ozs__ 7 1/8 |
| Sodium erythorbate | oz__ 7/8 |

The above composition was reproduced as four separate lots. Each lot was emulsified, then promptly encased as frankfurters, and promptly entered into the smokehouse at 220° F. The frankfurters were removed at various times as given in Table XIV below, at the internal temperature also given in the table. All the frankfurters were good edible products, and had good color improving as the final internal temperature increased. Other properties are given in the table.

TABLE XIV

| Ex. | Cure Time At 220°F. | Internal Temp., °F. | Emulsion pH | Finished pH | Color |
|---|---|---|---|---|---|
| 5a | 28 mins | 155 | 5.78 | 5.60 | 46.5 |
| 5b | 29 mins | 160 | 5.65 | 5.62 | 51.0 |
| 5c | 32 mins | 165 | 5.65 | 5.60 | 55.5 |
| 5d | 36 mins | 170 | 5.60 | 5.60 | 58.0 |

Table XV shows how the internal temperature, time, color, shrink and residual nitrite of frankfurters vary at different smokehouse temperatures.

TABLE XV

| Ex. | Temp., °F. Smokehouse | Temp., °F. Internal | Time, min. | Shrink, percent | Acetone Color | Residual Nitrite, p.p.m. |
|---|---|---|---|---|---|---|
| 5a | 220 | 155 | 28 | | 46.5 | |
| 5b | 220 | 160 | 29 | | 51.0 | |
| 5c | 220 | 165 | 32 | 4 | 55 | 66 |
| 5d | 220 | 170 | 36 | | 58 | |
| 5e | 220 | 175 | 38 | 5.4 | 59 | 62 |
| 5f | 220 | 185 | 40 | 5.4 | 62.5 | 59 |
| 5g | 220 | 195 | 67 | 9.4 | 62.5 | 46 |
| 5h | 250 | 205 | 50 | 12 | 64.5 | 44 |

The residual nitrite column indicates that the nitrite is utilized in improving the color.

Examples 5e to 5g are additional use of Composition No. 6, demonstrating longer times, better color and more shrinkage, at 220° F. Example 5h shows even better color, but more shrinkage, at 250° F. smokehouse temperature, and 205° F. internal temperature.

Example 6.—To show 300° F. in smokehouse

The following meat Composition No. 7 was employed:

| | Parts by weight |
|---|---|
| Lean beef | 35 lbs. |
| Steer flanks | 45 lbs. |
| Skinned jowls | 20 lbs. |
| Ice | 22 lbs. |
| Sodium chloride | 2 lbs. 4 ozs. |
| Curing salt: | |
| Sodium chloride, 90%; sodium nitrite, 6%; sodium nitrate, 4% | 4 ozs. |
| Glucono delta lactone | 7.1 ozs. |
| Sodium erythorbate | .9 oz. |
| Frankfurter seasoning | 8 ozs. |

The meat mass of Composition No. 6 was at 34° F. before the emulsification, which processing elevated its temperature to 60° F. The emulsion was stuffed into frankfurter casings and entered into a smokehouse at 300° F. dry bulb. In 11 minutes the frankfurters were removed, the wet bulb temperature being 275° F., and the internal temperature of the meat being 153° F. The shrinkage was determined to be 2.6%. The removed casings were chilled to 110° F., held at room temperature for one hour, then entered into a chill room at 34° F. for 2 hours. The frankfurters peeled easily, showed no fat rendering, had an excellent reddish skin color, and a nice pink interior.

Example 7

The following meat Composition No. 8 was employed:

| | Parts by weight |
|---|---|
| Beef knuckles | lbs__ 50 |
| Skinned pork jowls | lbs__ 50 |
| Ice | lbs__ 30 |
| Sodium chloride | lbs__ 2.5 |
| Curing salt: | |
| Sodium chloride, 90%; sodium nitrite, 6%; sodium nitrate, 4% | lbs__ .25 |
| Seasoning | lb__ .5 |
| Sodium erythorbate | oz__ 7/8 |

The meat composition as given above was emulsified in a conventional chopper. After formation of the emulsion one-half ounce of citric acid was mixed into the emulsion. The emulsion was promptly encased and heated to an internal temperature of 164°–165° F. on the following schedule:

23 minutes at 225° F. D.B.
3 minutes at 225° F. D.B.
  160° F. W.B.

The sausages were chilled in water to an internal temperature of 110° F., then dried at room temperature before transferring to a storage cooler. There was no fat rendering and an acceptable pink color.

It is to be understood that the data given in the foregoing description with respect to the amount of lactone or acid used per unit weight of meat, cannot be accepted as absolute. It may be above, or below, or at a critical ratio bounding the conditions for and against fat rendering. This is due to the quality of the meat, and in particular, to the amount of lactic acid in the meat due to its age and source.

From the foregoing it is to be appreciated that the invention may be practiced with numerous modifications and departures from the illustrative examples, within the scope of the invention as expressed in the appended claims.

We claim:

1. An accelerated method for curing emulsified meat comprising emulsifying a meat mass at a pH below 7 and not higher than the pH of the meat component thereof, which pH is higher than the hereinafter-mentioned pH, said mass containing curing salt including essentially alkali-metal nitrite and containing ene-diol material, promptly encasing the emulsion, then promptly heating the encased emulsion which is characterized by the presence of a non-shorting quantity of edible acid greater than is present during emulsification and by a resulting pH lower than that in the mass during emulsification, said heating being effected in the presence of non-shorting acidity in amount which is at least as much as results from the hydrolysis of 2 ounces of glucono delta lactone per 100 lbs. of meat plus the lactic acid content of the meat before emulsification, said heating being effected in a humid environment at a temperature in the range from 200° F. to 300° F. to attain an internal temperature of at least 150° F., whereby said meat is cured and its color fixed upon attaining said internal temperature, removing the cured meat from said environment, and cooling the removed meat.

2. The method of claim 1 in which the ene-diol material is sodium erythorbate.

3. An accelerated method for curing emulsified meat comprising emulsifying a meat mass at a pH below 7 and not higher than the pH of the meat component thereof, which pH is higher than the hereinafter-mentioned pH, said mass containing a non-shorting quantity of lactone which slowly hydrolyzes to edible acid in the resulting emulsion, containing curing salt including essentially alkali-metal nitrite, and containing ene-diol material, promptly encasing the emulsion, then promptly heating the encased emulsion which is characterized by the presence of a non-shorting quantity of edible acid greater than is present during emulsification and by a resulting pH lower than that in the mass during emulsification, said heating being effected in the presence of non-shorting acidity in amount which is at least as much as results from the hydrolysis of 2 ounces of glucono delta lactone per 100 lbs. of meat plus the lactic acid content of the meat before emulsification, said heating being effected in a humid environment at a temperature in the range from 200° F. to 300° F. to attain an internal temperature of at least 150° F., whereby said meat is cured and its color fixed upon attaining said internal temperature, removing the cured meat from said environment, and cooling the removed meat.

4. The method of claim 3 in which the ene-diol material is sodium erythorbate.

5. The method of claim 3 in which the lactone is glucono delta lactone.

References Cited

UNITED STATES PATENTS

| | | | |
|---|---|---|---|
| 2,739,899 | 3/1956 | Holenbeck | 99—159 |
| 2,876,115 | 3/1959 | Epstein | 99—159 X |
| 2,992,115 | 7/1961 | Sair et al. | 99—159 |
| 2,992,116 | 7/1961 | Sair | 99—159 |

HYMAN LORD, *Primary Examiner.*

M. O. WOLK, *Examiner.*